United States Patent Office 3,090,655
Patented May 21, 1963

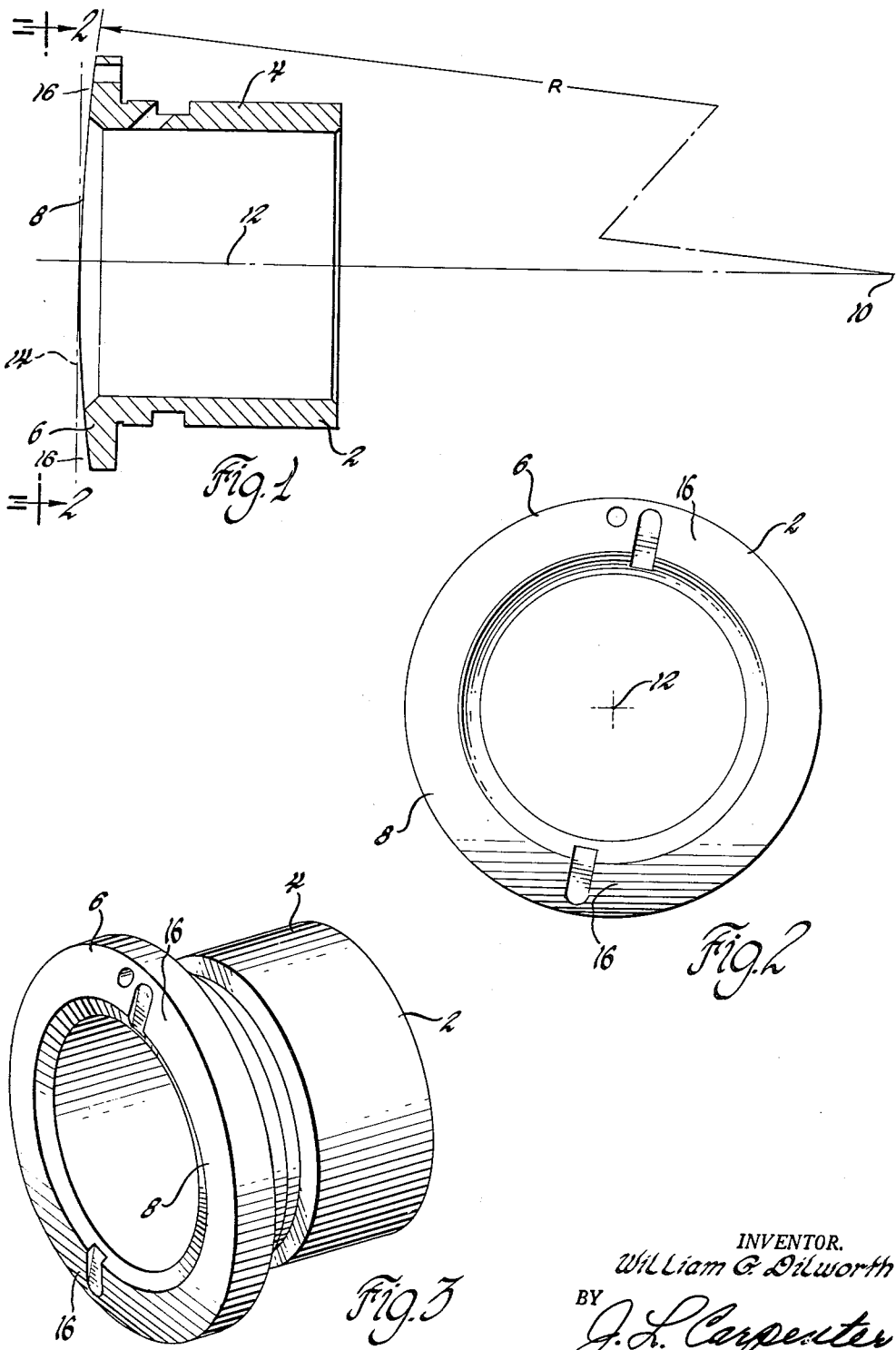

3,090,655
THRUST BEARING
William G. Dilworth, La Grange, Ill., assignor to General Motors Corporation, Detroit, Mich., a corporation of Delaware
Filed Oct. 14, 1960, Ser. No. 62,610
2 Claims. (Cl. 308—37)

This invention relates generally to bearings and more particularly to thrust bearings in which the thrust face thereof rotates relative to a flat thrust face.

One of the problems associated with most bearings is the proper lubrication thereof. This is particularly true of thrust bearings of the type adapted to rotate at very high speeds under considerable thrust load. I have found that by providing a thrust bearing whose thrust face is specially curved such as in the form of a convex cylindrical surface, wedge clearances will be formed between the convex surface and a flat thrust face against which the thrust bearing rotates. These wedge clearances are adapted to receive oil or other lubricant which is then carried about in a rotating manner by being pushed in front of that part of the thrust face coming in contact with the flat thrust face. This area of contact is actually a line of contact which sweeps around on the flat thrust face as the cylindrical thrust bearing rotates relative thereto.

It is, therefore, an object of this invention to provide a thrust bearing which has as a thrust face a convex cylindrical surface.

It is a further object of this invention to provide a thrust bearing which has a convex cylindrical face adapted to form with a flat thrust face against which it bears a double wedge clearance to accommodate lubricant between the two thrust faces during relative rotation thereof.

For a fuller understanding of these and other objects of this invention, reference may be made to the accompanying detailed description taken in conjunction with the drawing in which:

FIGURE 1 is a side view in section of a bearing having a thrust face of the form described above.

FIGURE 2 is an end view taken on the line 2—2 of FIGURE 1 also illustrating the cylindrical convex characteristic of the thrust face.

FIGURE 3 is a view in perspective of the thrust bearing.

Referring now to the drawing, the bearing is indicated by a numeral 2. Bearing 2 includes a radial portion 4 and a thrust portion 6 formed on one end of the radial portion.

It will be noted that the thrust portion 6 has a convex cylindrical surface 8 which is generated by a line rotating on the end of a radius R extending from an axis 10 which is normal to and perpendicular to the axis 12 of the thrust and radial portions of the bearing.

As particularly shown in FIGURE 1, the convex cylindrical thrust face 8 is adapted to rotate against a flat thrust face 14 shown in phantom.

Formed between the flat thrust face 14 and the convex thrust face 8 on opposite sides of the line of contact between these faces are wedge clearances 16. These wedge clearances 16 are adapted to receive lubricant which, as the cylindrical convex thrust face rotates on flat thrust face 14, will tend to lubricate the bearing surfaces (actually a single line of contact between these two faces). This is true because as one face rotates relative to the other, there is a tendency for the convex thrust face 8 to ride up over the lubricant wedged between the faces 8 and 14.

I have found that the special curvature of thrust face 8 improves the lubrication of the thrust faces and prolongs the life of thrust bearings, particularly for thrust bearings which are subject to relatively high rotational speeds.

I claim:
1. In combination a flat thrust surface and a rotatable thrust bearing member cooperating therewith, said bearing member having an end thrust face engaging said flat thrust surface for rotation thereon, said end thrust face comprising a single convex cylindrical surface generated by a line rotated about an axis perpendicular to and intersecting the axis of rotation of said bearing member.

2. The combination of claim 1 which further includes a radial bearing section on said bearing member.

References Cited in the file of this patent

UNITED STATES PATENTS

| | | |
|---|---|---|
| 1,236,511 | Waring | Aug. 14, 1917 |
| 1,978,689 | Peters | Oct. 30, 1934 |
| 2,368,611 | Charnock | Jan. 30, 1945 |
| 2,537,432 | Triplett | Jan. 9, 1951 |
| 2,588,126 | Kurtz | Mar. 4, 1952 |
| 2,937,908 | Golten | May 24, 1960 |

FOREIGN PATENTS

| | | |
|---|---|---|
| 668,079 | France | Oct. 28, 1929 |